Dec. 20, 1966  TAKAYOSHI SATO ETAL  3,292,515
PHOTOGRAPHIC CAMERA WITH AUTOMATIC DIAPHRAGM DEVICE
Filed May 12, 1964                        2 Sheets-Sheet 1
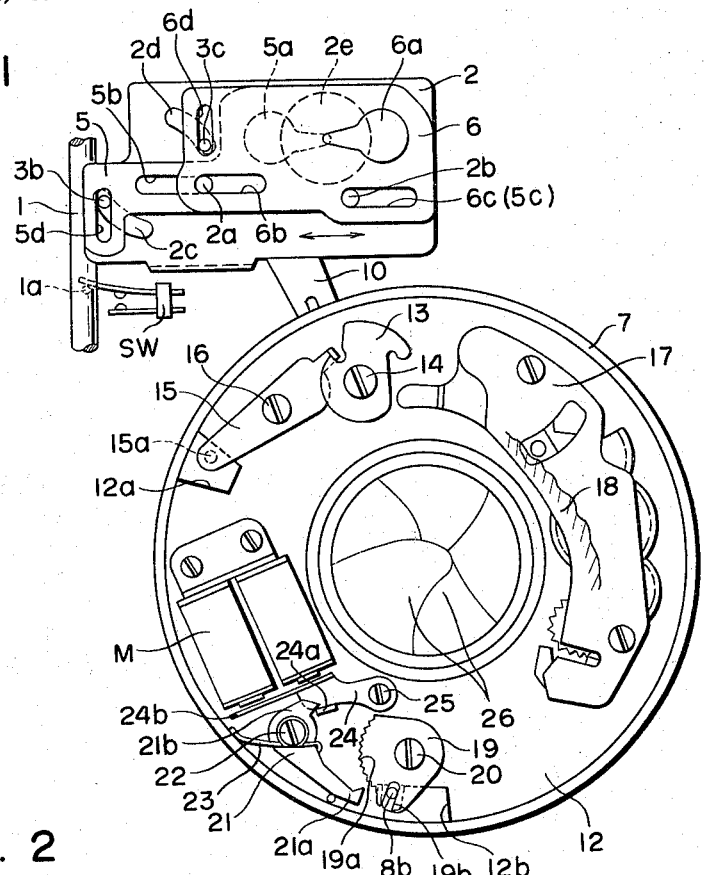
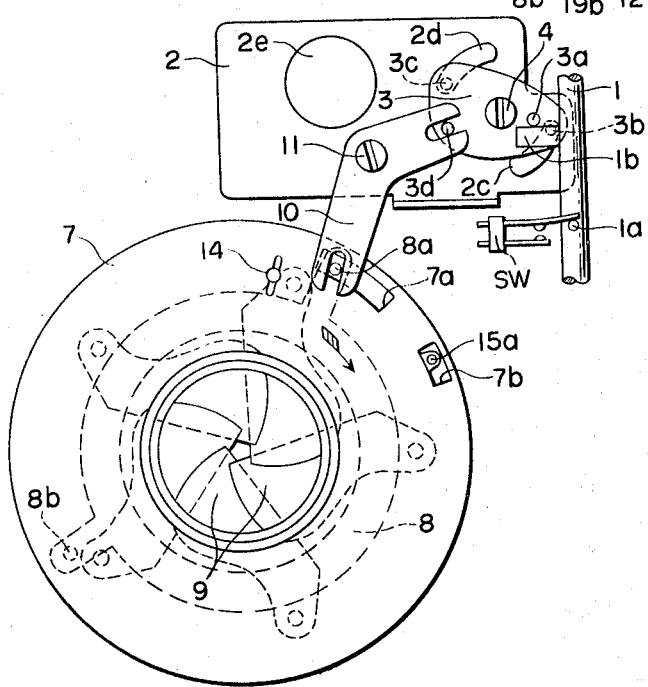

3,292,515
PHOTOGRAPHIC CAMERA WITH AUTOMATIC DIAPHRAGM DEVICE

Takayoshi Sato, Itabashi-ku, Tokyo-to, and Tomio Kikuchi, Toshima-ku, Tokyo-to, Japan, assignors to Kabushiki Kaisha Copal, Tokyo-to, Japan, a joint-stock company of Japan
Filed May 12, 1964, Ser. No. 366,806
Claims priority, application Japan, May 13, 1963, 38/25,044
4 Claims. (Cl. 95—10)

The present invention relates to photographic cameras provided with an automatic diaphragm device, and more particularly it relates to a photographic camera provided with an electronic device to automatically control the diaphragm of a photographic lens with respect to a predetermined exposure time without using any exposure meter.

In a conventional photographic camera apparatus wherein the exposure time is preset by a mechanical slow-governor for automatically determining the lens diaphragm depending upon brightness of an object to be measured by the exposure meter incorporated within the camera body, it was necessary to dispose the exposure meter at a position adjacent to the said diaphragm mechanism of the photographic lens so as to have the exposure meter and the diaphragm mechanism interlocking each other, which caused considerable restriction in designing the camera as well as extreme difficulties and high cost in manufacturing and frequent troubles on the part of the camera on account of the exposure meter being required to be small in size and precise in operation.

The present invention has been successful in eliminating the above-described disadvantages by utilizing an electronic device including transistors instead of a conventional exposure meter, wherein a power switch for the electronic device is closed at first with release of the camera shutter then the amount of light to be received from a photographing object by the photoconductive element which is interlocked with the lens diaphragm mechanism is controlled and, when the said lens diaphragm will have reached the optimum condition for exposing, the said diaphragm mechanism is locked by a locking device through the action of an electromagnet which is actuated by the electronic device, and finally the shutter blade driving mechanism is caused to release.

According to the present invention, therefore, it becomes possible to dispense the exposure meter which is very difficult to manufacture, and to dispose the photoconductive element, transistors, electromagnet and the power source, etc. of the electronic device separately in the camera body because of their capability of being connected electrically with the result that designing of the camera becomes very easy.

Therefore, it is the prime object of the present invention to provide a photographic camera having an automatic diaphragm device wherein the exposure time is preset by manually adjusting the slow-governor, then the lens diaphragm mechanism and a mechanism for controlling the amount of light to be received by the photoconductive element are interlocked and when the said diaphragm mechanism reaches the optimum diaphragm aperture, an electronic device including transistors and being connected with the said photoconductive element is actuated so that the lens diaphragm may be locked by an electromagnet through media of the locking device, whereby the lens diaphragm can be determined automatically at the time of releasing the shutter.

The novel features which are considered as characteristic of the present invention are set forth in particular in the appended claims.

The invention itself, however, both as to its construction and its method of operation, together with additional objects and advantages thereof, will be best understood from the following detailed description of the specific embodiments when read in connection with the accompanying drawings, in which the same or equivalent members are designated by the same reference numerals and letters, and in which:

FIG. 1 is a front elevational view, as viewed in the direction of the optical axis, showing certain mechanical elements of one embodiment of this invention;

FIG. 2 is a back view of the embodiment shown in FIG. 1;

Figure 3:
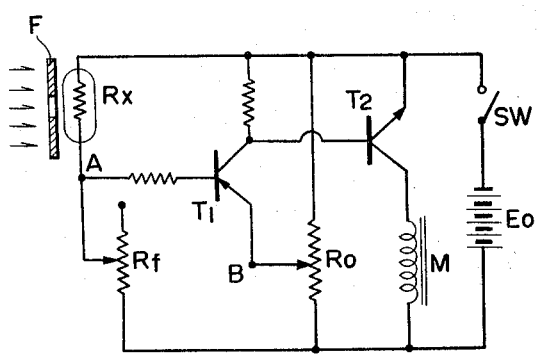
FIG. 3 is an example of a circuit diagram of an electronic device which is suitable for the embodiment shown in FIGS. 1 and 2.

Referring to FIGS. 1 through 3, the release rod 1 of the camera possesses a pin $1_a$ which causes the power switch SW of the electronic circuit to close when it is pushed down, and a projected arm $1_b$ which contacts with a pin $3_a$ fixed on an operating member 3. This operating member 3 is pivotally attached by a pin 4 onto a base plate 2 which is secured on the camera body and is pressed down by a spring (not shown) in the clockwise direction as shown in FIG. 2. The said base plate 2 is provided with guide pins $2_a$ and $2_b$, slots $2_c$ and $2_d$ into which are inserted the pins $3_b$ and $3_c$ of the operating member 3, and a light receiving opening $2_e$ of a photoconductive element. Control plates 5 and 6 having diagram apertures $5_a$ and $6_a$ are respectively fitted with the guide pins $2_a$ and $2_b$ by the respective slots $5_b$, $5_c$ and $6_d$, $6_c$ in a slidable manner toward the direction shown with arrow-mark. The said control plates 5 and 6 are caused to move in opposite direction, respectively, due to the rotation of the operating member 3 through engagements of the pin $3_b$ and the slot $5_b$ as well as the pin $3_c$ and the slot $6_d$, thereby controlling the amount of light to be received by the photoconductive element.

In the drawing, the control of the amount of light to be received by the photoconductive element is illustrated by a case wherein a light receiving area is made to vary. However, the same result can be obtained, as is well known, even by controlling the amount of light using a filter.

A diagram adjusting ring 8 which is disposed between a shutter housing 7 and a base plate 12 has a pin $8_a$ projecting from an opening $7_a$ into the back of the shutter housing and also has another pin $8_b$ projecting from an opening $12_b$ into the front surface of the base plate 12. The rotation of the said ring 8 in the direction of arrow-mark as shown in FIG. 2 causes diaphragm blades 9 to open. A connecting lever 10 pivotally fitted onto the base plate 2 by a pin 11 has its one arm made a pin-slot connection with a pin $3_d$ of the operating member 3, and has its other arm made a pin-slot connection with the pin $8_a$ of the said ring 8, respectively. A driving member 13 which is fixed by a shutter cocking shaft 14 is made to rotate in the clockwise direction by a driving spring (not shown) due to counterclockwise rotation of a release lever 15 which is pivotally fitted to the base plate 12 by a shaft 16. As the result, the shutter blades 26 are caused to open and close by a well-known method.

A pin $15_a$ of the release lever 15 pierces through the openings $12_a$ and $7_b$, projects out to the back side of the shutter and is operated at the final stage of the pushing down motion of the release bar 1. A slow-governor 17 is adjusted by a set ring 18 for presetting exposure time.

A member 19 which is pivotally fitted on the base plate 12 by a shaft 20 has notches $19_a$ and a slot $19_b$ which is connected with a pin $8_b$. A lock lever 21 which is pivotally fitted by a shaft 22 and forcibly pushed in the clockwise direction by a spring 23 has a locking portion $21_a$ which engages with the notches $19_a$. A lever 24 which is pivotally fitted by a shaft 25 has a bent $24_b$ which is attracted by an electromagnet M and another bent $24_a$ which engages with the arm $21_b$ of the lock lever 21.

FIG. 3 shows an electronic control circuit suitable for the device shown in FIGS. 1 and 2, which comprises a control device F, corresponding to the control plates 5 and 6 in FIGS. 1 and 2, for controlling the amount of light to be received by a photoconductive element $Rx$, a variable resistor $Rf$ being adjustable with respect to setting of the exposure time set ring 18, a variable resistor $Ro$ being adjustable depending on the sensitivity of photographic film, a power source $Eo$ and transistors $T_1$ and $T_2$.

The operations of the above circuit will now be explained with respect to the embodiment of the diaphragm mechanism as shown in FIGS. 1 and 2. First of all, when the variable resistor $Ro$ is manually adjusted according to the sensitivity of photographic film to be used, and then the exposure time set ring 18 is preset at a desired exposure time, the value of the variable resistor $Rf$ in FIG. 3 is determined. Next, when the release bar 1 of the camera is pushed down, the pin $1_a$ goes downward, whereby a power switch SW is closed and the circuit of the electronic device becomes electrically conductive. When the release bar 1 is further pushed downwardly with this condition, the operating member 3 is caused to rotate in the clockwise direction as in FIG. 2 due to force of a spring (not shown), whereby the light receiving area of the photoconductive element $Rx$ is increased by the diaphragm apertures $5_a$ and $6_a$ of the control plates 5 and 6, and, simultaneously, the diaphragm adjusting ring 8 is caused to rotate in the direction of the arrow-mark by means of the connecting lever 10 to gradually enlarge the diaphragm aperture.

In the course of the above-described motion, when the resistance value of the photoconductive element $Rx$ becomes gradually smaller and the polarity of potential points A and at the B in FIG. 3 is changed, the transistors $T_1$ and $T_2$ become conductive and electric current flows in the electromagnet M. At this moment, the electromagnet M attracts a lever 24 to cause the lock lever 21 to rotate in the counter-clockwise direction against the spring 23, then, the locking portion $21_a$ of the said lock lever 21 engages with a notch $19_a$ of the member 19; whereby the automatic control action of the lens diaphragm mechanism is stopped. At the final stage of pushing down the release bar 1, the release lever 15 is moved causing the driving member 13 to rotate and the shutter blades 26 thus open and shut under the optimum exposure condition.

Upon completion of photographing, when the release bar 1 is released from its push-down action, the said bar 1 and the control plates 5 and 6 restore to their respective original positions as shown in FIG. 1 by a forceful restituting spring (not shown). At this moment, the diaphragm adjusting ring 8 overcomes the attraction of the electromagnet M and rotates, whereby the lens diaphragm becomes full-open. Finally, the power switch SW is opened by the pin $1_a$ and the electronic device also returns to the original state.

In the above embodiment, we have illustrated a case wherein the electromagnet is actuated when the diameter of the diaphragm has been determined with respect to the exposure time, whereby the locking device is attracted by the electromagnet so as to set the diaphragm mechanism in a locked position. And now we will explain a case with reference to FIGS. 4 and 5 wherein the locking device causes the lens diaphragm mechanism to be locked when the diaphragm aperture has become appropriate and the electromagnet inoperable.

Since this embodiment is almost same as the embodiment in FIGS. 1 through 3, the like parts which perform equivalent functions are designated by like reference characters.

Figure 4:
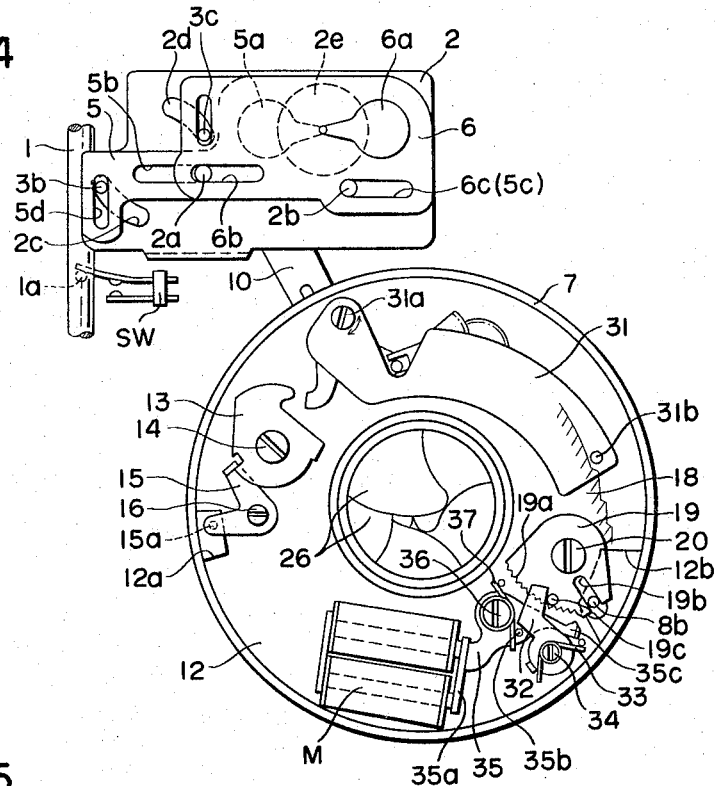
FIG. 4 is a front view showing another embodiment of the present invention.

Referring to FIG. 4, a slow governor 31 rotates around a shaft $31_a$ by adjustment of an exposure time set ring 18 which engages with a pin $31_b$, and controls the rotation speed of the driving member 13 by the angle of engagement. A lever 32 which is pivotally fitted on a base plate 12 by a shaft 34 is pressed in the clockwise direction by a spring 33. However, in the normal state, the rotation of this lever 32 is prevented by a pin $19_c$ of a member 19. A lock lever 35 pivotally attached by a shaft 36 has a bent $35_a$ which is attracted by an electromagnet M, a pin $35_b$ contacting the lever 32, and a locking portion $35_c$ which is engaged with notches $19_a$ of the member 19, the said bent $35_a$ normally contacting the electromagnet M. Also, a spring 37 is provided around the shaft 36 so as to push the said lever 35 in the counterclockwise direction.

Figure 5:
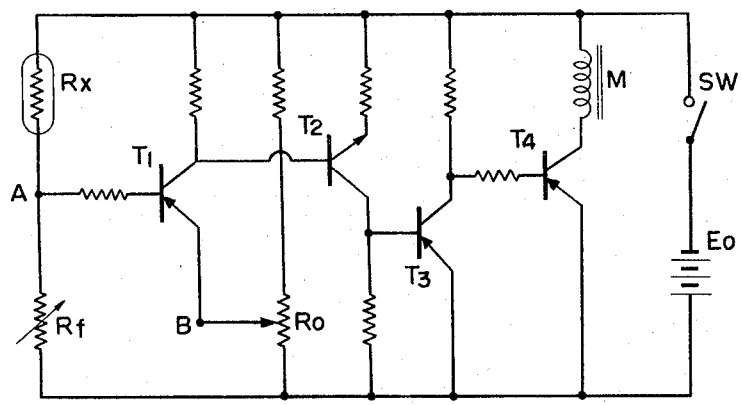
FIG. 5 is another example of a circuit diagram of the electronic device suitable for the embodiment shown in FIG. 4.

FIG. 5 shows an electronic control circuit suitable for the device shown in FIG. 4, and the operations of the embodiment in FIG. 4 will now be explained hereinafter in relation to FIG. 5.

After the resistor $Ro$ is manually adjusted according to the sensitivity of photographic film to be used and the resistor $Rf$ is adjusted with a slow-governor 31 set at a desired exposure time, when the power switch SW for the electronic device is first closed by pushing down a release bar 1 of the camera, transistors $T_1$ through $T_3$ are shutoff due to extremely large resistance value of a photoconductive element $Rx$, and a transistor $T_4$ becomes conductive, with the result that the electromagnet M becomes actuated and the magnetic force works between the bent $35_a$ of the lever 35 and the electromagnet M. In such a condition, when the release bar 1 is further pressed down, the amount of light to be received by the photoconductive element $Rx$ begins to be controlled, as explained in the foregoing description of the embodiment in FIGS. 1 through 3, i.e., as the resistance value of the photoconductive element $Rx$ becomes gradually smaller, the diaphragm mechanism of the lens is caused to operate to increase gradually the diaphragm aperture. As this moment, the member 19 is caused to rotate in the counterclockwise direction in FIG. 4 whereby the lever 32 rotates in the clockwise direction due to a spring 33, while the lever 35 does not rotate as it is attracted by the electromagnet M.

In the above-mentioned diaphragm controlling motion, when the resistance value of the photoconductive element $Rx$ is reduced and the polarity of potential at the points A and B turns into reverse, transistors $T_1$ through $T_3$ becomes conductive and a transistor $T_4$ becomes shutoff. Consequently, the function of the electromagnet is stopped and the lever 35 is caused to rotate in a counterclockwise direction due to the force of the spring 37 and the locking portion $35_c$ thereof is engaged with a notch $19_a$ of the member 19, thereby stopping the diaphragm controlling motion.

At the end of the push-down motion of the release bar 1, the release lever 15 is caused to rotate in the counterclockwise direction, whereby the shutter blades 26 are made to open and close under the optimum exposure condition by rotation of the driving member 13.

Since it is obvious that many changes and modifications can be made in the above described details without departing from the nature and spirit of the invention, it is to be understood that the invention is not to be limited to the details described herein except as set forth in the appended claims.

What is claimed is:
1. A photographic camera apparatus having an automatic diaphragm device which comprises in combination: a mechanical delaying means which can be adjusted man- ually by means of an exposure time setting member so as to obtain a desired exposure time beforehand; a means for controlling the amount of light to be received by a photoconductive element with release of a camera release control; a diaphragm means which adjusts the diaphragm aperture of a photographic lens being coupled with controlling motion of said last mentioned means for controlling the amount of light to be received; a locking means which locks the adjusting motion of said diaphragm means, when the optimum diaphragm aperture is obtained with respect to the preset exposure time in the course of the adjusting motion of the said lens diaphragm; an electromagnet for operating said locking means; an electronic means containing therein variable resistors which vary the resistance values in accordance with adjustment of the said exposure time setting member, and a plurality of transistors means which performs conduction, shutoff and change of polarity of said transistors based on relations between the resistance values of said variable resistors and those of said photoconductive element, and thereby operate said electromagnet; and a means for opening and shutting the shutter blades which is motivated at the final stage of releasing the camera release control.

2. The photographic camera apparatus as claimed in claim 1, wherein said locking means is adapted to lock said diaphragm means when an electric current flows in the electromagnet.

3. The photographic camera apparatus as claimed in claim 1, wherein said locking means is adapted to lock said diaphragm means when an electric current which has been flowing in the electromagnet is shutoff.

4. The photographic camera as claimed in claim 1, wherein means for controlling the amount of light to be received by the photoconductive element is such that adjusts the light receiving area of the photoconductive element with release of the camera release control.

References Cited by the Examiner
UNITED STATES PATENTS

| | | | |
|---|---|---|---|
| 2,194,031 | 3/1940 | Riszdorfer | 95—10 |
| 3,116,673 | 1/1964 | Bogopolsky | 95—64 |
| 3,143,054 | 8/1964 | Ploke | 95—64 |
| 3,183,808 | 5/1965 | Teshi | 95—64 X |
| 3,205,803 | 9/1965 | Burgarella | 95—10 X |
| 3,212,394 | 10/1965 | Norwood | 95—10 X |
| 3,220,326 | 11/1965 | Scudder | 95—10 |

NORTON ANSHER, *Primary Examiner.*

JOHN M. HORAN, *Examiner.*

CLIFFORD B. PRICE, *Assistant Examiner.*